US011097611B2

(12) United States Patent
Mukasa et al.

(10) Patent No.: US 11,097,611 B2
(45) Date of Patent: Aug. 24, 2021

(54) VENT CONTROL VALVE FOR FUEL TANK

(71) Applicant: KYOSAN DENKI CO., LTD., Koga (JP)

(72) Inventors: Yusuke Mukasa, Koga (JP); Nobuharu Muto, Koga (JP)

(73) Assignee: KYOSAN DENKI CO., LTD., Koga (JP)

( * ) Notice: Subject to any disclaimer, the term of this patent is extended or adjusted under 35 U.S.C. 154(b) by 559 days.

(21) Appl. No.: 15/743,298

(22) PCT Filed: Sep. 6, 2016

(86) PCT No.: PCT/JP2016/076084
§ 371 (c)(1),
(2) Date: Jan. 10, 2018

(87) PCT Pub. No.: WO2017/068883
PCT Pub. Date: Apr. 27, 2017

(65) Prior Publication Data
US 2020/0079209 A1 Mar. 12, 2020

(30) Foreign Application Priority Data
Oct. 22, 2015 (JP) .............................. JP2015-208310

(51) Int. Cl.
*F16K 24/04* (2006.01)
*B60K 15/035* (2006.01)

(52) U.S. Cl.
CPC ...... *B60K 15/03519* (2013.01); *F16K 24/046* (2013.01); *F16K 24/042* (2013.01); *Y10T 137/0874* (2015.04); *Y10T 137/3099* (2015.04)

(58) Field of Classification Search
CPC ............ B60K 15/035; B60K 15/03504; B60K 15/03289; B60K 15/03519;
(Continued)

(56) References Cited

U.S. PATENT DOCUMENTS 5,873,382 A * 2/1999 Hattori .................. F16K 24/044
137/202
6,035,884 A * 3/2000 King ................ B60K 15/03519
137/202
(Continued)

FOREIGN PATENT DOCUMENTS

CN 101815627 A 8/2010
JP 2013082427 A 5/2013
(Continued)

OTHER PUBLICATIONS

U.S. Appl. No. 15/743,300, filed Jan. 10, 2018, Sugiyama et al.

*Primary Examiner* — Craig J Price
(74) *Attorney, Agent, or Firm* — Harness, Dickey & Pierce, P.L.C.

(57) ABSTRACT

A vent control valve includes: a first case shaped in a tube that forms a passage for ventilation; a movable valve object arranged in the first case to open and close the passage; an inner case arranged in the first case to support the movable valve object; a second case disposed at a lower end of the first case; a first connection mechanism defined between the first case and the inner case, the first connection mechanism connecting the first case and the inner case with each other; and a second connection mechanism defined between the first case and the second case, the second connection mechanism connecting the first case and the second case with each other.

6 Claims, 4 Drawing Sheets

(58) Field of Classification Search
CPC ... B60K 2015/0772; B60K 2015/03289; F16L 47/02; F16L 47/14; F02M 37/017; F02M 37/0076; F16K 24/04; F16K 24/06; F16K 24/042; F16K 27/07; F16K 31/22; F16K 24/046; F16K 31/18; F16K 33/00; Y10T 137/053; Y10T 137/0753; Y10T 137/0777; Y10T 137/0874; Y10T 137/3099; Y10T 137/6004; Y10T 137/7358; Y10T 137/7423; Y10T 137/7426; Y10T 137/86324; Y10T 137/86332
USPC ..... 137/15.26, 38, 39, 43, 315.08, 409, 429, 137/430, 587, 588; 220/86.2, 745, 746; 141/59, 198, 202, 229; 123/516, 518, 123/198 D, 520
See application file for complete search history.

(56) References Cited

U.S. PATENT DOCUMENTS

| | | | | |
|---|---|---|---|---|
| 8,307,840 | B2 * | 11/2012 | Kobayashi | B60K 15/03519 123/516 |
| 9,188,236 | B2 * | 11/2015 | Suzuki | F16K 24/044 |
| 9,494,325 | B2 * | 11/2016 | Shimokawa | F02M 37/0082 |
| 9,518,671 | B2 * | 12/2016 | Sui | F16K 24/042 |
| 9,671,037 | B2 * | 6/2017 | Kaneko | F16K 24/044 |
| 9,783,046 | B2 * | 10/2017 | Sui | B60K 15/03519 |
| 10,011,169 | B2 * | 7/2018 | Suzuki | B60K 15/035 |
| 10,525,821 | B2 * | 1/2020 | Sugiyama | B60K 15/03519 |
| 2008/0251134 | A1 * | 10/2008 | Miura | F16K 24/044 137/409 |
| 2010/0224265 | A1 | 9/2010 | Kobayashi et al. | |
| 2010/0252125 | A1 * | 10/2010 | Roth | F16K 1/34 137/409 |
| 2013/0075394 | A1 | 3/2013 | Suzuki | |
| 2014/0230920 | A1 | 8/2014 | Shimokawa et al. | |
| 2016/0031315 | A1 | 2/2016 | Suzuki | |
| 2018/0313461 | A1 | 11/2018 | Sugiyama et al. | |
| 2019/0070954 | A1 * | 3/2019 | Mukasa | F16K 24/044 |

FOREIGN PATENT DOCUMENTS

| | | | |
|---|---|---|---|
| JP | 2014159209 A | 9/2014 | |
| WO | WO-2017068882 A1 * | 4/2017 | ............... F16K 1/34 |
| WO | WO-2017068884 A1 * | 4/2017 | ....... B60K 15/03519 |

* cited by examiner

VENT CONTROL VALVE FOR FUEL TANK

CROSS REFERENCE TO RELATED APPLICATIONS

This application is a U.S. National Phase Application under 35 U.S.C. 371 of International Application No. PCT/JP2016/076084 filed on Sep. 6, 2016 and published in Japanese as WO 2017/068883 A1 on Apr. 27, 2017. This application is based on and claims the benefit of priority from Japanese Patent Application No. 2015-208310 filed on Oct. 22, 2015. The entire disclosures of all of the above applications are incorporated herein by reference.

TECHNICAL FIELD

The present disclosure relates to a vent control valve that opens and closes a vent passage of a fuel tank.

BACKGROUND ART

Each of Patent Literature 1 and Patent Literature 2 discloses a float valve disposed in a vent passage of a fuel tank. The float valve is applied as a fuel supply control valve in the disclosure. The fuel supply control valve may be also called as a full control valve that controls the fuel supply to make the fuel tank full (where the fuel is supplied to the maximum of the fuel tank). This equipment controls the passage of fuel evaporated in the fuel tank to stop a fueling device. This equipment is equipped with two valves for controlling the passage. This equipment has a float valve that is closed to stop the passage by floating in liquid fuel, when the fuel reaches the float valve.

PRIOR ART LITERATURES

Patent Literature

Patent Literature 1: JP 2013-82427 A
Patent Literature 2: JP 2014-159209 A

SUMMARY OF INVENTION

In the conventional art, the float valve is held in a main case by connecting an additional case to the lower part of the main case. However, if the additional case drops off on the lower side, the function of the float valve may be lost completely. In the above-described viewpoint and the other viewpoints which are not mentioned, the vent control valve for a fuel tank is further to be improved.

It is an object of the present disclosure to provide a vent control valve for a fuel tank, from which a component is restricted from dropping off.

It is another object of the present disclosure to provide a vent control valve for a fuel tank, which can maintain the main valve function even if a component drops off.

According to an aspect of the present disclosure, a vent control valve for a fuel tank controls ventilation between a fuel tank and the exterior. The vent control valve includes: a first case shaped in a tube that forms a passage for ventilation; a movable valve object arranged in the first case to open and close the passage, the movable valve object being inserted in the first case from a lower end opening of the first case; an inner case arranged in the first case to support the movable valve object, the inner case being inserted in the first case from the lower end opening of the first case; a second case disposed at a lower end of the first case; a first connection mechanism disposed between the first case and the inner case, the first connection mechanism connecting the first case and the inner case with each other; and a second connection mechanism disposed between the first case and the second case, the second connection mechanism connecting the first case and the second case with each other.

According to the vent control valve of the present disclosure, the inner case which supports the movable valve object is connected to the first case by the first connection mechanism. Therefore, the inner case is connected to the first case, without being dependent on the second case. Thereby, the inner case can be arranged at a regulated position within the first case even if there is no second case. The movable valve object can be positioned at a regular position even if there is no second case. Therefore, the function provided by the movable valve object is maintained even if there is no second case.

The present disclosure employs the following technical means, in order to attain the above-mentioned object. The symbols in the parenthesis indicated in claims merely show correspondence relations with concrete elements described in embodiments later mentioned as one example, and are not intended to limit the technical scope of this disclosure. The above and other objects, features and advantages of the present disclosure will become more apparent from the following detailed description made with reference to the accompanying drawings.

DESCRIPTION OF EMBODIMENTS

Figure 1:
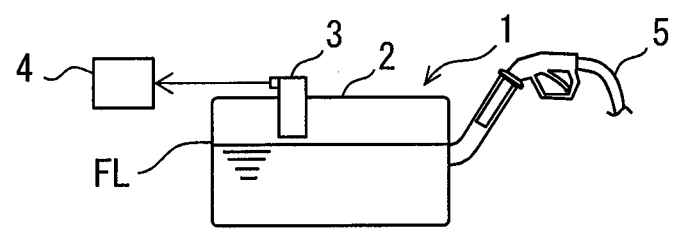
FIG. 1 is a block diagram of a fuel storage equipment according to a first embodiment.

Embodiments are described referring to the drawings. In the embodiments, portions, which may be corresponded and/or associated in functionally and/or structurally, may be indicated by the same reference symbols or reference symbols which merely differs at hundred or above digits. Description of other embodiment can be referred to for corresponding portions and/or associated portions.

First Embodiment

As shown in FIG. 1, a fuel storage equipment 1 includes a fuel tank 2, a fuel supply control valve 3, and a fuel evaporation processing unit 4. The fuel storage equipment 1 is disposed in a vehicle. The fuel storage equipment 1 may include a fuel supply device which supplies fuel to an internal-combustion engine of the vehicle.

The fuel supply control valve 3 is arranged in the fuel tank 2. The fuel supply control valve 3 may be arranged in the fuel supply device such as pump module in the fuel tank 2. The fuel supply control valve 3 provides a float valve for the fuel tank. The fuel supply control valve 3 controls a ventilation between the fuel tank 2 and the exterior. The fuel supply control valve 3 is arranged in a vent passage for ventilation between the fuel tank 2 and the fuel evaporation processing unit 4. The vent passage is used for discharge gas from the fuel tank 2 to the fuel evaporation processing unit 4. The vent passage is also called as a ventilation passage or a respiratory passage. The fuel supply control valve 3 opens and closes the vent passage. The fuel supply control valve 3 is disposed on an upper wall surface of the fuel tank 2.

The fuel supply control valve 3 permits ventilation between the fuel tank 2 and the fuel evaporation processing unit 4, such that fuel can be supplied from a fueling port. The fuel supply control valve 3 intercepts the ventilation between the fuel tank 2 and the fuel evaporation processing unit 4 to stop the fuel supply from the fueling port. When the fuel supply control valve 3 intercepts the ventilation, the liquid surface of fuel goes up towards the fueling port. As a result, an automatic shutoff (may also be called as an auto stop mechanism) of the fueling device 5 reacts, and the fuel supply from the fueling device 5 is stopped automatically.

The fuel evaporation processing unit 4 includes a canister which catches the fuel evaporation (vapor) contained in the gas discharged from the fuel tank 2. The fuel evaporation processing unit 4 includes a purge mechanism. The purge mechanism will process the fuel evaporation by supplying the fuel evaporation caught by the canister to the internal-combustion engine, so as to be combusted, when a predetermined condition is satisfied.

Figure 2:
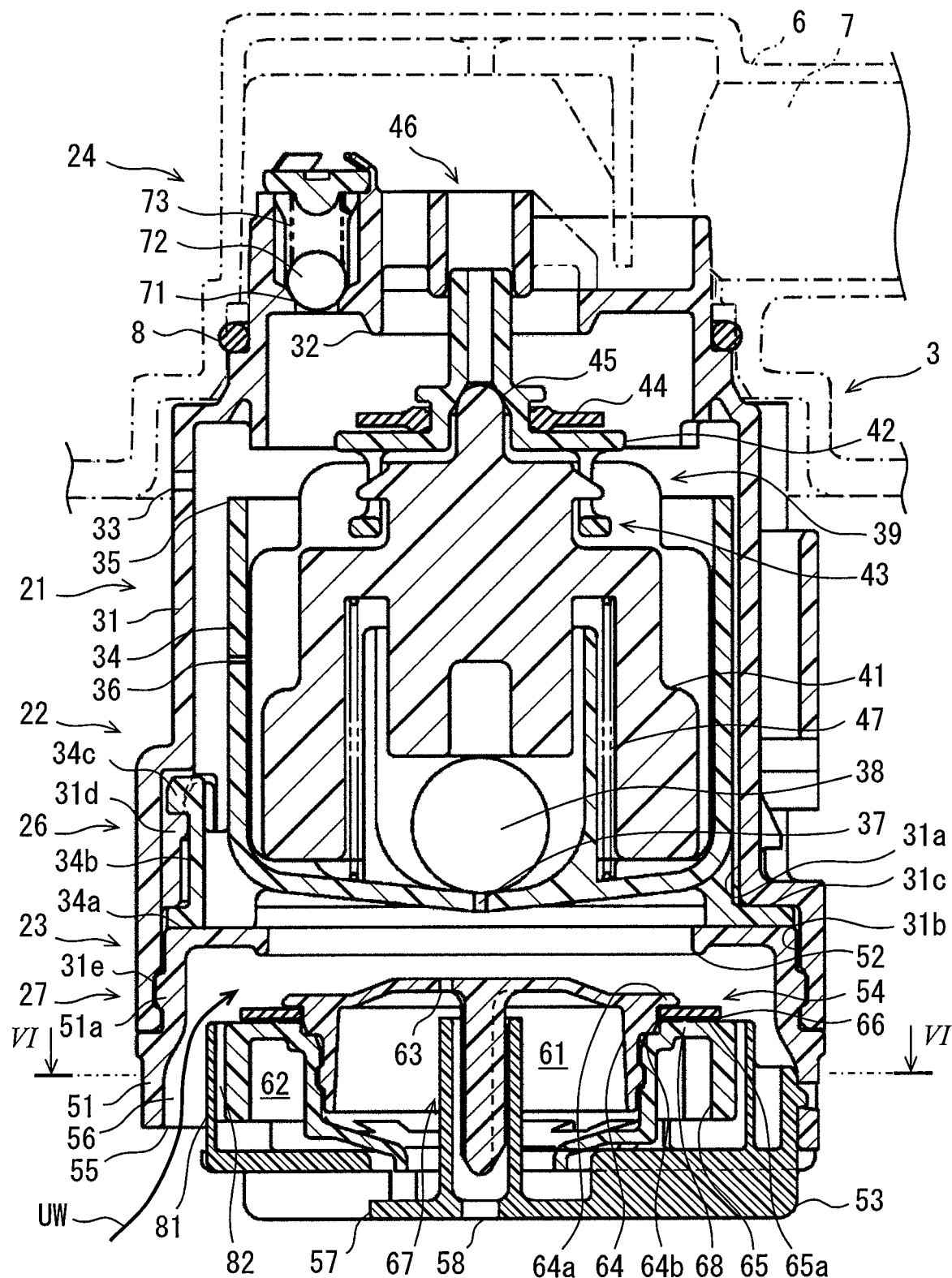
FIG. 2 is a longitudinal cross-section view illustrating a vent control valve for a fuel tank according to a first embodiment.

In FIG. 2, the fuel supply control valve 3 is attached to a flange 6 disposed in the upper part of the fuel tank 2. The flange 6 is a product made of resin, or metal. The flange 6 is a component which covers the opening of the fuel tank 2. The flange 6 can be provided for exclusive use for attaching the fuel supply control valve 3, or a component for attaching the other fuel tank accessories. The flange 6 defines a passage 7 between the fuel tank 2 and the fuel evaporation processing unit 4.

The fuel supply control valve 3 is arranged in the fuel tank 2 through the flange 6. The fuel supply control valve 3 extends perpendicularly downward into the fuel tank 2 from the flange 6. The fuel supply control valve 3 and the flange 6 are connected by a connection mechanism such as a snap fit mechanism. An O ring 8 is disposed between the fuel supply control valve 3 and the flange 6 as a seal component. When the vehicle is on a horizontal plane (i.e., when the fuel tank 2 is placed in the horizontal state), the fuel supply control valve 3 is installed, as illustrated, as a vertical pipe.

The fuel supply control valve 3 has a cylindrical appearance extending downward from the upper part of the fuel tank 2. The fuel supply control valve 3 provides the cylindrical pipe defined by components of cases 31, 34, 51, and 53. The pipe enables the fuel surface to go upward inside of the pipe, while securing air space out of the pipe (upper part of the fuel tank 2) when the fuel surface is arriving at the upper end of the fuel tank 2. The pipe can also be called as an air chamber formation pipe. The upper end of the pipe is communicated with the passage 7, and the lower end of the pipe is open at a position slightly lower than the upper end of the fuel tank 2. The pipe extends perpendicularly downward from the upper part of the fuel tank 2, and defines the ventilation passage. The fuel supply control valve 3 controls the communication state between the fuel tank 2 and the passage 7 depending on the fuel surface in the pipe, so as to open and close the ventilation passage. The fuel supply control valve 3 has a main float valve 21, a fuel retainer 22, a sub float valve 23, and a relief valve 24.

(Main Float Valve)

The main float valve 21 is arranged in the pipe. The main float valve 21 opens the ventilation passage, when there is no fuel in the pipe. The main float valve 21 floats in the fuel which reaches the pipe, and closes the ventilation passage. The main float valve 21 opens and closes the ventilation passage in response to the fuel surface (the first liquid surface height) comparatively on the upper side of the pipe.

The fuel retainer 22 provides a fuel reservoir for adjusting the opening-and-closing nature of the main float valve 21. The fuel retainer 22 is also an opening-and-closing nature regulation mechanism for preventing frequent opening and closing, for example, a re-open within a short period of time after the main float valve 21 is closed. The fuel retainer 22 maintains the main float valve 21 in the closed state over a period until it is assumed that a fuel supply worker ends the fuel supply work after confirming the fuel tank 2 is filled with fuel.

The fuel supply control valve 3 has the first case 31. The first case 31 is also a part of the main float valve 21. The first case 31 is a cylindrical component. The first case 31 forms a passage for ventilation between inside and outside of the fuel tank 2. The first case 31 is installed in the fuel tank 2 so that the axis of the pipe is positioned perpendicularly. The first case 31 is a pipe open on the lower side in a state where the first case 31 is attached in the fuel tank 2. The first case 31 is shaped in a cylinder with a step in which the inside diameter becomes larger gradually as extending downward.

The upper end of the first case 31 is connected with the flange 6. An opening is defined in the upper end of the first case 31 to make the inside of the fuel tank 2 to communicate with the passage 7. This opening is defined by being surrounded by the first valve seat 32.

The lower end of the first case 31 has an open end which communicates with the fuel tank 2. The sub float valve 23 is arranged at the lower end of the first case 31. The lower end of the first case 31 is opened and closed by the sub float valve 23.

A through hole 33 is defined at a predetermined position in the upper part of the first case 31. The through hole 33 makes inside and outside of the first case 31 to communicate with each other. The through hole 33 enables discharge of fuel from the upper part of the first case 31, and/or supply of air to the upper part of the first case 31.

The fuel supply control valve 3 has the inner cup 34. The inner cup 34 is also a part of the fuel retainer 22. The inner cup 34 is housed in the first case 31. The inner cup 34 can be inserted into the first case 31 from the lower end opening of the first case 31. The inner cup 34 has a cup shape which can store fuel. The inner cup 34 defines a fuel reservoir in the first case 31. The upper end opening 35 of the fuel reservoir defined by the inner cup 34 is located at the almost same height as the through hole 33. The inner cup 34 is formed so that fuel is introduced from the upper end opening 35 so as to be stored.

The inner cup 34 is connected to the first case 31 and is held in the first case 31 by a connection mechanism 26. The connection mechanism 26 includes a snap fit mechanism which uses elasticity of resin. The inner cup 34 is held also by being inserted between the first case 31 and the second case 51. In other words, the inner cup 34 is held in the first case 31 by being supported by the second case 51.

The inner cup 34 has a through hole 36 defined in the side wall, and a through hole 37 defined in the bottom wall. The through hole 36 enables discharge of fuel from the fuel reservoir in the inner cup 34. The through hole 36 discharges fuel slowly. The through hole 36 is set up small to allow a slow leak of fuel during a comparatively long period of time that is predicted that the operator of the fueling device 5 will give up additional fuel supply. The bottom wall of the inner cup 34 is formed to define a funnel-shaped bottom surface inside. The through hole 37 is open at the lowest position of the bottom wall. The through hole 37 is formed comparatively large to discharge fuel quickly. The inner cup 34 provides a component which forms the fuel reservoir storing fuel, in order to maintain the closed state of the main float valve 21.

The main float valve 21 has a ball 38. The ball 38 can block the through hole 37. Moreover, the ball 38 can open the through hole 37 by rolling when receiving shake. The ball 38 may be replaced with various components, such as a roller or a thin piece for receiving shake. The inner cup 34 and the ball 38 provide the fuel retainer 22. The inner cup 34 and the ball 38 provide a discharge valve for discharging the fuel in the inner cup 34 in a period after the fuel supply work is completed. The ball 38 rolls by detecting the shake of the fuel tank 2, which is caused when the vehicle is driven. The through holes 36, 37 and the ball 38 provide discharge means for discharging fuel from the fuel reservoir defined by the inner cup 34. The discharge means retain fuel to prevent an excess fuel supply in one fuel supply work, and allows a fuel supply again after fuel supply work is completed. The through hole 37 and the ball 38 provide means for determining the end of fuel supply work and for discharging fuel.

The main float valve 21 has the movable valve object 39. The movable valve object 39 is also called a main movable valve object or a first movable valve object in the fuel supply control valve 3. The movable valve object 39 is housed in the first case 31. The movable valve object 39 can be inserted into the first case 31 from the lower end opening of the first case 31. The movable valve object 39 is housed in the inner cup 34. The movable valve object 39 is housed to be movable in the axial direction, i.e., the up-and-down direction, inside the first case 31 and the inner cup 34.

The movable valve object 39 is configured to float in fuel when fuel exists in the inner cup 34. The movable valve object 39 has the float 41. The float 41 is housed in the inner cup 34. The inner cup 34 provides an inner case which supports the movable valve object 39. The movable valve object 39 has the holder 42. The holder 42 is arranged above the float 41. The holder 42 is connected with the float 41 through the connection mechanism 43. The connection mechanism 43 is provided by a projection part of the float 41, and a hook part of the holder 42 which has an elongated slot in the height direction to accept the projection part. The projection part moves inside the slot of the hook part to allow a play. The connection mechanism 43 connects the float 41 and the holder 42 to be separable by a predetermined dimension in the axial direction.

The holder 42 holds the seal component 44. The seal component 44 is an annular board. The seal component 44 is tightly inserted on the cylindrical portion of the holder 42. The holder 42 and the seal component 44 intercept the communication between the fuel tank 2 and the passage 7, when the movable valve object 39 is seated on the valve seat 32 (i.e., when the seal component 44 is seated on the valve seat 32). The closed state of the main float valve 21 is provided by the seal component 44 seated on the valve seat 32. When the seal component 44 separates from the valve seat 32, the open state of the main float valve 21 is provided.

A pilot valve 45 for assisting the opening of the main float valve 21 is formed between the float 41 and the holder 42. The float 41 has a hemispherical convex part. The holder 42 has a seat surface which accepts the convex part. The pilot valve 45 is opened and closed by the play provided by the connection mechanism 43. When the seal component 44 is seated on the valve seat 32, the pressure in the fuel tank 2 becomes higher than that in the passage 7. When the float 41 moves downward due to the fall in fuel surface, the connection mechanism 43 permits the float 41 to separate from the holder 42. As a result, the pilot valve 45 opens. When the pilot valve 45 opens, the pressure difference is eased between the front and the back of the seal component 44, and the seal component 44 becomes easy to separate from the valve seat 32.

The float 41 is guided in the up-and-down direction, i.e., the axial direction, in the inner cup 34. The inner cup 34 provides an inner pipe and an outer pipe for guiding the float 41. Furthermore, a guide mechanism 46 is disposed between the holder 42 and the first case 31. The guide mechanism 46 is provided by a small-diameter cylindrical portion of the holder 42, and a large-diameter cylindrical portion of the first case 31. The small-diameter cylindrical portion is arranged in the large-diameter cylindrical portion, such that the holder 42 is guided without being deviated in a radial direction, to be moveable in the axial direction. A spring 47 in the compression state is arranged between the inner cup 34 and the float 41. The spring 47 biases the movable valve object 39 upward to support the buoyant force of the movable valve object 39.

The first case 31, the inner cup 34, the float 41, and the holder 42 are products made of resin. The ball 38 is a product made of resin. The seal component 44 is a product made of rubber.

(Sub Float Valve)

The sub float valve 23 is arranged upstream side of the main float valve 21. The sub float valve 23 controls the flow of fuel to the main float valve 21. The sub float valve 23 prevents fuel from reaching the main float valve 21 when the fuel surface rises temporary. If the fuel surface is continuously raised, the sub float valve 23 permits fuel to reach the main float valve 21. The sub float valve 23 is arranged adjacent to the fuel tank 2 than the main float valve 21 is, in the pipe. The sub float valve 23 is arranged near the entrance of the pipe, on the lower side. The sub float valve 23 opens the ventilation passage when there is no fuel in the pipe, and closes the ventilation passage by floating in the fuel flowing into the pipe. Thereby, the sub float valve 23 limits the fuel from reaching the main float valve 21. The sub float valve 23 opens and closes the passage inside the pipe, i.e., the ventilation passage between the entrance of the pipe and the main float valve 21, in response to the fuel surface at the entrance of the pipe.

The fuel supply control valve 3 has the second case 51. The second case 51 is also a part of the sub float valve 23. The second case 51 is a cylindrical component. The second case 51 is attached to the lower end opening of the first case 31. The first case 31 and the second case 51 are connected with each other.

The second case 51 is connected to the first case 31 and is held in the first case 31 by the connection mechanism 27. The connection mechanism 27 includes a snap fit mechanism in which the elasticity of resin is used. The second case 51 is connected to the open end of the first case 31. The inner cup 34 is held within the first case 31 on the deeper side than the second case 51.

An opening is defined in the upper wall of the second case 51 to communicate the inside of the fuel tank 2 and the inside of the first case 31. The opening is surrounded and defined by the second valve seat 52. The second valve seat 52 is positioned on the upstream side than the first valve seat 32 in the air flow direction in the fuel supply control valve 3. In other words, the second valve seat 52 is located on more inner side in the fuel tank 2 than the first valve seat 32 is. The opening defined by the second valve seat 52 is larger than the opening defined by the first valve seat 32. The diameter of the opening defined by the second valve seat 52 is larger than the radius of the first case 31.

The fuel supply control valve 3 has a third case 53. The third case 53 is also a part of the sub float valve 23. The third case 53 has a shallow plate shape. The third case 53 is attached to the lower end of the second case 51. The second case 51 and the third case 53 are connected by a snap fit.

The sub float valve 23 has the movable valve object 54. The movable valve object 54 is also called a sub movable valve object or a second movable valve object in the fuel supply control valve 3. The movable valve object 54 is shaped flat and cylindrical. The movable valve object 54 is received between the second case 51 and the third case 53. The movable valve object 54 is movable relative to the second valve seat 52. The movable valve object 54 floats in the fuel in the fuel tank 2, thereby being seated on or separating from the second valve seat 52. The movable valve object 54 opens and closes a passage communicating from the lower end of the first case 31 to the main float valve 21.

Figure 3:
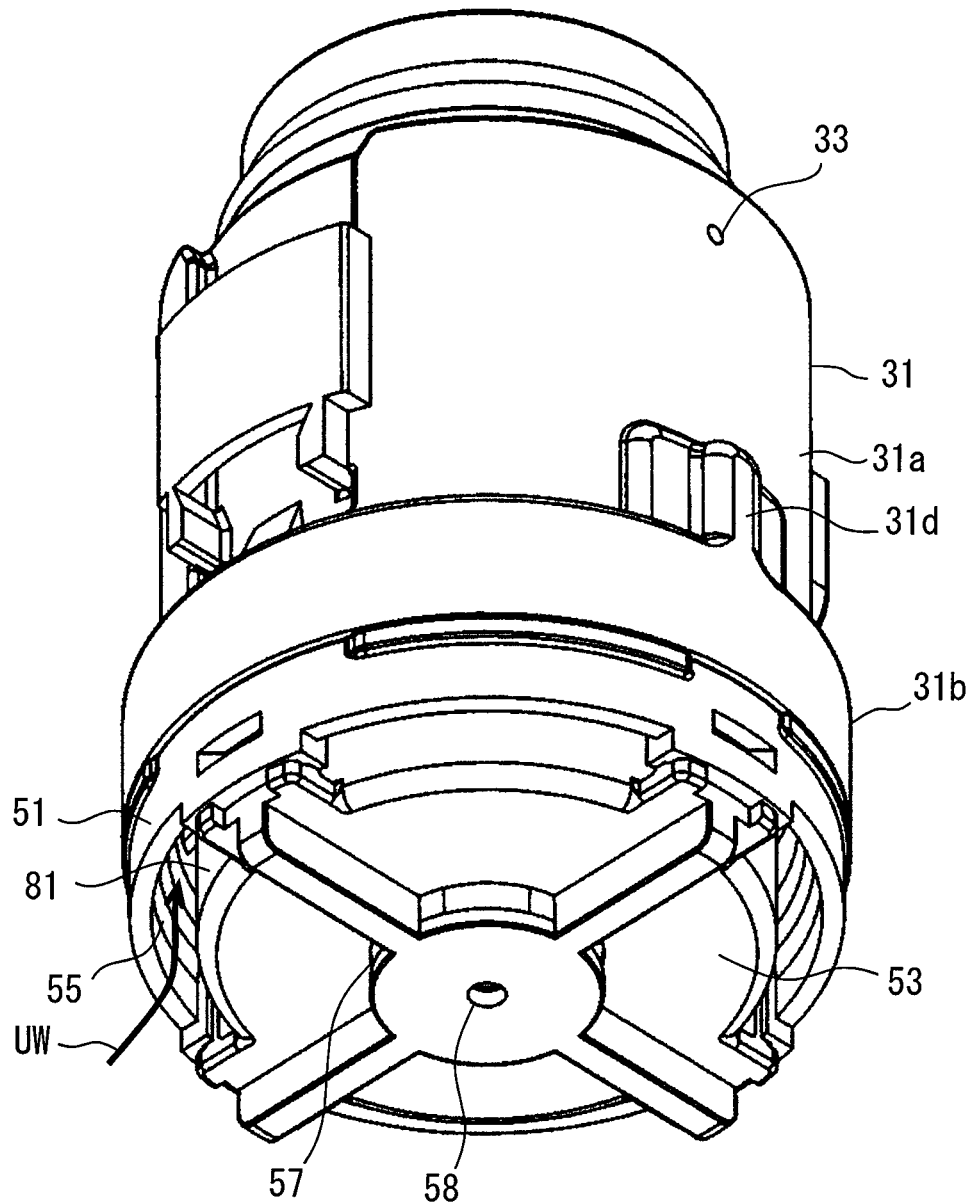
FIG. 3 is a perspective view illustrating a side and a bottom of the first embodiment.
Figure 6:
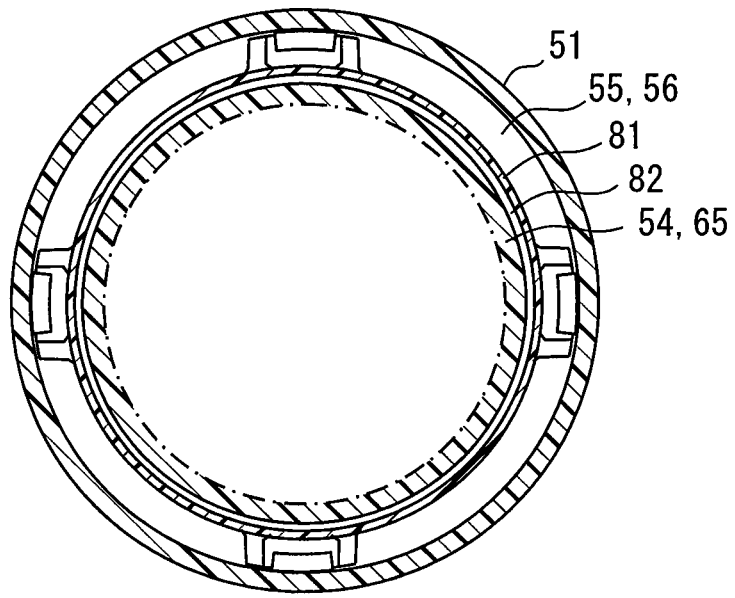
FIG. 6 is a sectional view of the first embodiment taken along a line VI-VI in FIG. 2.

As shown in FIG. 3 and FIG. 6, the opening 55 is open along the circumferential direction, in the lower end of the second case 51. The opening 55 has plural arc-shaped portions. The opening 55 is open annularly as a whole. The opening 55 is open at an outer side of the movable valve object 54 in the radial direction. An outer passage 56 is defined on the outer side of the movable valve object 54 in the radial direction. The outer passage 56 is annular. The outer passage 56 is defined on the inner side of the second case 51 in the radial direction. The outer passage 56 extends in the axial direction from the opening 55. The outer passage 56 is extended along the inner surface of the second case 51. The outer passage 56 extends between the opening 55 and the passage defined by the valve seat 52.

The third case 53 has auxiliary openings 57 and 58. The opening 57 mainly provides a passage for fuel on the lower side of the movable valve object 54. The opening 58 mainly provides a passage for fuel on the lower side of the guide mechanism 67 to be mentioned later.

Among the openings 55, 57, and 58, the opening 55 has the largest opening area. The opening 55 is a main lower end opening or entrance opening of the pipe in the fuel supply control valve 3. The opening 55 is also called a lower end opening or entrance opening as an entrance of the ventilation passage.

The third case 53 provides a cover covering the lower side of the movable valve object 54, and supporting the movable valve object 54 from the bottom. The third case 53 forms a housing chamber for the movable valve object 54 between the second case 51 and the third case 53, and forms the opening 55 in the lower end of the second case 51. The lower end of the housing chamber is communicated with the fuel tank 2 through the openings 55, 57, and 58. Therefore, the fuel in the fuel tank 2 can freely go into the housing chamber defined by at least the second case 51 and the third case 53.

The movable valve object 54 defines plural air reservoirs 61 and 62. The air reservoirs 61 and 62 accumulate air under the surface of fuel, such that the movable valve object 54 floats in fuel. The air reservoirs 61 and 62 include a first air reservoir 61 and a second air reservoir 62. The air reservoirs 61 and 62 provide a lift chamber for floating the movable valve object 54 on fuel, when the fuel reaches the movable valve object 54. The air reservoirs 61 and 62 are defined by a cap-shaped component open on the lower side.

The first air reservoir 61 is located in the central part of the movable valve object 54 in the radial direction. The first air reservoir 61 is arranged to occupy the central portion of the movable valve object 54 in the radial direction. The first air reservoir 61 is arranged at the upper part of the movable valve object 54. The first air reservoir 61 stores air under the surface of fuel, such that the movable valve object 54 floats in fuel.

The first air reservoir 61 includes a buoyant force reduction mechanism which gradually decreases the buoyant force given to the movable valve object 54, with a time progress after fuel reaches the movable valve object 54. The movable valve object 54 has a through hole 63 for decreasing the buoyant force gradually. The through hole 63 provides the buoyant force reduction mechanism which gradually decreases the buoyant force by introducing fuel into the first air reservoir 61 with discharging air from the first air reservoir 61. The buoyant force reduction mechanism causes the movable valve object 54 to sink gradually in fuel.

The second air reservoir 62 is arranged on the outer side of the movable valve object 54 in the radial direction. The second air reservoir 62 is positioned at a central part or a lower part of the movable valve object 54 in the up-and-down direction. The second air reservoir 62 is arranged on an outer side of at least a part of the first air reservoir 61 in the radial direction. The second air reservoir 62 is arranged to surround at least a part of the first air reservoir 61. The second air reservoir 62 is not equipped with the buoyant force reduction means such as the through hole 63. The second air reservoir 62 has plural small chambers. The small chambers are dispersively arranged along the circumferential direction. The second air reservoir 62 is annularly arranged along the second valve seat 52, and each can accumulate air independently. The second air reservoir 62 is annularly arranged along the outer circumference of the movable valve object.

The movable valve object 54 has a first component 64 and a second component 65. The first component 64 provides an upper part and a central part of the movable valve object 54. The first component 64 can also be called as an upper float or inner float. The first component 64 is cylindrical. The first component 64 has a cap shape open at the lower end. The first component 64 has the through hole 63 in the upper wall. The through hole 63 is open inside the opening surrounded by the second valve seat 52. The second component 65 provides a lower part and a perimeter part of the movable valve object 54. The second component 65 can also be called as a lower float or outer float. The second component 65 is annular. The first component 64 is arranged inside the second component 65 in the radial direction.

The first component 64 and the second component 65 provide a formation component which defines the plural air reservoirs 61 and 62. The second component 65 provides a formation component which defines the plural second air reservoirs 62. The plural second air reservoirs 62 are located to be distributed along the circumferential direction of the movable valve object 54. The plural second air reservoirs 62 are equally distributed along the circumferential direction. Such arrangement produces advantage of restricting undesirable buoyant force distribution in the circumferential direction. The first component 64 has the through hole 63 as the buoyant force reduction means. The first component 64 and the second component 65 are connected by a connection mechanism such as a snap fit. The first component 64 and the second component 65 are connectable using various connection technique such as adhesion or welding. The first component 64 and the second component 65 are products made of resin.

The movable valve object 54 has the seal component 66. The seal component 66 is arranged on the upper surface of the movable valve object 54. The seal component 66 is a product made of rubber, or a product made of resin. The seal component 66 is a plate-shaped component. The seal component 66 is seated on or separated from the second valve seat 52. The seal component 66 opens and closes the passage for ventilation by moving with the movable valve object 54 in the move direction. The seal component 66 is seated on the second valve seat 52 when the movable valve object 54 moves upward by floating in fuel. The seal component 66 closes the ventilation passage by being seated on the second valve seat 52. The seal component 66 is separated from the second valve seat 52 when the movable valve object 54 sinks in fuel or is moved downward by the fall in the surface of fuel. The seal component 66 opens the ventilation passage by separating from the second valve seat 52.

As shown in FIG. 2, the fuel supply control valve 3 has the guide mechanism 67 for the movable valve object 54. The guide mechanism 67 is provided by a guide shaft disposed in the movable valve object 54, and a guide pipe disposed in the third case 53. The guide shaft is inserted in the guide pipe. The guide pipe may be disposed in the movable valve object 54, and the guide shaft may be disposed in the third case 53. The guide mechanism 67 permits movement of the movable valve object 54 in the move direction of the movable valve object 54, i.e., the axial direction of the fuel supply control valve 3. The guide mechanism 67 regulates movement of the movable valve object 54 in the radial direction. The guide mechanism 67 regulates inclination of the movable valve object 54. The guide mechanism 67 provides the stable contact between the second valve seat 52 and the seal component 66.

(Relief Valve)

The relief valve 24 controls the pressure in the fuel tank 2. The relief valve 24 is opened when the pressure in the fuel tank 2 becomes excessively high, to emit the gas from the fuel tank 2 to the passage 7. The relief valve 24 is formed in the upper wall of the first case 31. The relief valve 24 has the valve seat 71, the movable valve object 72, and the spring 73. The relief pressure is set by the movable valve object 72 and the spring 73.

(Seal Component of Sub Float Valve)

Figure 4:
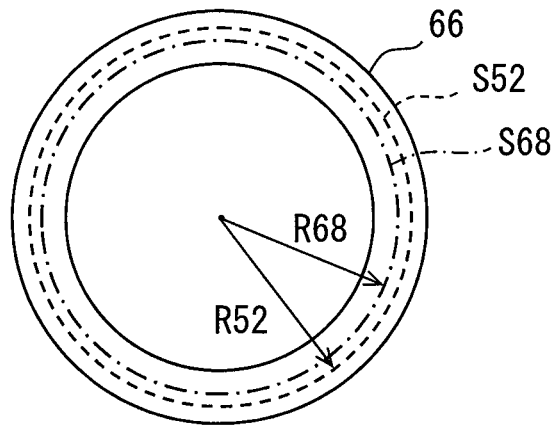
FIG. 4 is a plan view illustrating a seal component according to a first embodiment.

As illustrated in FIG. 2 and FIG. 4, the seal component 66 is an annular component which has an opening in the center. The seal component 66 has an inner periphery part 66a on the inner side in the radial direction. The inner periphery part 66a of the seal component 66 is loosely held by the movable valve object 54.

Figure 5:
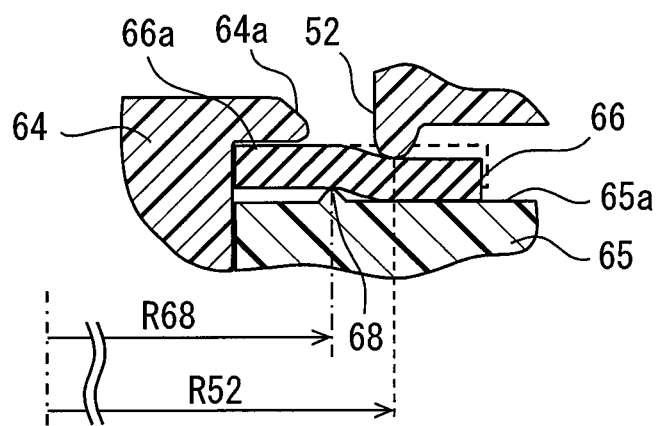
FIG. 5 is a partially enlarged cross-section view of the first embodiment.

As illustrated in FIG. 2 and FIG. 5, the seal component 66 is held between the first component 64 and the second component 65 connected by the connection mechanism such as snap fit.

The inner periphery part 66a is held between the flange part 64a of the first component 64 and the receiving surface 65a of the second component 65. A clearance is defined between the flange part 64a and the receiving surface 65a in the axial direction, and is larger than the thickness of the seal component 66. The flange part 64a and the receiving surface 65a are defined on the respective sides of the inner periphery part 66a in the move direction of the movable valve object 54. The flange part 64a and the receiving surface 65a hold the inner periphery part 66a loosely in the move direction.

The first component 64 has an axial part 64b located on the inner side of the inner periphery part 66a in the radial direction of the movable valve object 54. The inside diameter of the inner periphery part 66a is larger than the outer diameter of the axial part 64b. The axial part 64b holds the inner periphery part 66a loosely in the radial direction. The inner periphery part 66a is loosely fitted with the outer side of the axial part 64b of the first component 64. A minute clearance is defined between the inner periphery part 66a and the axial part 64b. The flange part 64a, the axial part 64b, and the receiving surface 65a provide a retaining mechanism in which the seal component 66 is held loosely. The inner periphery part 66a is loosely held both in the radial direction and the axial direction by the movable valve object 54. The loose retaining restricts the seal component 66 from being deformed.

The movable valve object 54 has a ridge part 68. The ridge part 68 annularly extends along the seal component 66. The ridge part 68 is formed in the second component 65. The ridge part 68 is formed to project from the receiving surface 65a towards the seal component 66 in the axial direction. The ridge part 68 is a triangular protruding part. The ridge part 68 has a triangular section. Two slopes of the ridge part 68 define an angle of about 60 degrees therebetween. The sharpness of the top of the ridge part 68 is set to form a seal line narrower than the base of the ridge part 68 relative to the seal component 66. The slope of the ridge part 68 may be set to define an angle within a range from 30 degrees to 120 degrees.

The ridge part 68 is projected to oppose the second valve seat 52. The second valve seat 52 is projected downward to the seal component 66. The ridge part 68 is projected upward to the seal component 66. The ridge part 68 can also be called as an annular projection or an annular angle part. The ridge part 68 is located on the outer side of the flange part 64a in the radial direction. The ridge part 68 is located on the inner side of the second valve seat 52 in the radial direction.

The height of the ridge part 68 is set up so that the seal component 66 can maintain free form without receiving preload when the seal component 66 is not in contact with the second valve seat 52. In other words, the height of the ridge part 68 is set up so that the seal component 66 can be held without being deformed by the flange part 64a, the receiving surface 65a and the ridge part 68 when the seal component 66 is not in contact with the second valve seat 52. Therefore, the ridge part 68 is set to maintain the loose retaining of the seal component 66.

In FIG. 4 and FIG. 5, when the seal component 66 in in contact with the second valve seat 52, the seal component 66 is supported between the movable valve object 54 and the second valve seat 52, and is slightly deformed. The seal component 66 is deformed into S-shape, or in a reverse-S-shape between the ridge part 68 and the second valve seat 52. The seal component 66 is stably forced onto both the ridge part 68 and the second valve seat 52 by its elasticity.

The second annular valve seat 52 and the seal component 66 are in contact with each other on the seal line S52. The radius R52 of the seal line S52 is equivalent to the radius of the second valve seat 52. The top part of the ridge part 68 is in contact with the seal component 66. The ridge part 68, i.e., the movable valve object 54 and the seal component 66 are in contact on the annular seal line S68. The radius R68 of the seal line S68 is equivalent to the radius of the ridge part 68. The seal line S52 is located on the outer side of the seal line S68 in the radial direction. The seal line S68 is located on the outer side of the flange part 64a in the radial direction.

The seal line S52 may be slightly deviated by a deviation of the central axis of the second valve seat 52 and the central axis of the seal component 66. The seal line S68 may be slightly deviated by a deviation of the central axis of the movable valve object 54 and the central axis of the seal component 66. The radius R52 and the radius R68 are set up so that the seal line S68 and the seal line S52 do not overlap nor cross even if the seal line S68 and the seal line S52 are deviated mutually on the seal component 66.

The contact between the seal component 66 and the ridge part 68 on the seal line S68 enables pressure to concentrate on the seal line S68. As a result, high seal nature is obtained in the seal line S68. Thereby, high seal nature can be given between the seal component 66 and the movable valve object 54.

Moreover, the ridge part 68 realizes a strong contact on the seal line S68, while permitting the seal component 66 to be loosely held by the movable valve object 54. Therefore, high seal nature is provided, without excessive deformation or undesirable deformation such as warpage in the seal component 66.

(Connection Mechanism)

In FIG. 2, the first case 31 has the small diameter part 31a and the large diameter part 31b. The small diameter part 31a has an inside diameter which can house the inner cup 34. The inside diameter of the small diameter part 31a is smaller than that of at least the large diameter part 31b. The large diameter part 31b is formed in the range including the opening end, i.e., the lower end of the first case 31. The large diameter part 31b has an inside diameter which can house the sub float valve 23. Specifically, the large diameter part 31b has an inside diameter which can house the second case 51. The stepped part 31c is formed between the small diameter part 31a and the large diameter part 31b. The stepped part 31c is formed on the inner surface of the first case 31. The stepped part 31c provides a step surface facing the opening end. The large diameter part 31b provides an easily-deformed portion which is easy to be deformed outward in the radial direction. The large diameter part 31b makes the fitting operation of the sub float valve 23, especially the second case 51, easier.

The connection mechanism 26 includes the flange part 34a that is defined in the inner cup 34. The flange part 34a is a plate-shaped portion which is in contact with the stepped part 31c. The flange part 34a is projected outward in the radial direction from the inner cup 34. The flange part 34a specifies the position of the inner cup 34 within the first case 31 by contacting the stepped part 31c. The flange part 34a is interposed between the first case 31 and the second case 51 in the axial direction. The flange part 34a is inserted between the stepped part 31c and the second case 51.

The connection mechanism 26 has a snap fit mechanism provided between the first case 31 and the inner cup 34. The snap fit mechanism is provided by the arm part 34b, the engaging part 34c, and the engaging part 31d.

The inner cup 34 has the arm part 34b extending from the flange part 34a upward in the axial direction. The arm part 34b extends along the axial direction to separate from the second connection mechanism 27. The inner cup 34 has plural arm parts 34b arranged to be spaced from each other in the circumferential direction. The arm part 34b is integrally molded with the inner cup 34 by resin material. The arm part 34b is able to be elastically deformed. The engaging part 34c is formed at the tip end of each arm part 34b. The engaging part 34c is movable in the radial direction by the elastic deformation of the arm part 34b. The engaging part 34c is also called as a movable engaging part or a first engaging part.

The first case 31 has the engaging part 31d on which the engaging part 34c is hooked. The engaging part 31d is formed in a cave projected outward in the radial direction, to accept the arm part 34b and the engaging part 34c. The arm part 34b and the engaging part 34c provide a hook part which can be hooked on the engaging part 31d. The arm part 34b provides the amount of elastic deformation so that the engaging part 31d and the engaging part 34c are engaged with each other and that the engagement is maintained. The engaging part 31d is also called as a fixed engaging part or a second engaging part.

As illustrated in FIG. 3, a protruding part which forms the engaging part 31d is defined on the outer surface of the first case 31. The engaging part 31d is positioned within the range of the small diameter part 31a.

One of the engaging parts 34c and 31d has a convex form, and the other has a concave form. The engaging parts 34c and 31d can be engaged with or separated from each other, using the elastic deformation of the arm part 34b and the elastic deformation of the first case 31. The engaging parts 34c and 31d reach the illustrated engagement state by being elastically deformed in a process where the inner cup 34 is inserted into the first case 31.

The connection mechanism 27 has the snap fit mechanism that is defined between the first case 31 and the second case 51. The snap fit mechanism is provided by the engaging part 31e and the engaging part 51a. The engaging part 31e is formed in the first case 31. The engaging part 31e is formed in the large diameter part 31b. The engaging part 51a is formed in the second case 51. One of the engaging parts 31e and 51a has a convex form, and the other has a concave form. The engaging parts 31e and 51a reach the illustrated engagement state by being elastically deformed in a process where the second case 51 is inserted into the first case 31.

The connection mechanism 26 provides an independent connection mechanism between the inner cup 34 and the first case 31. The connection mechanism 26 enables the inner cup 34 to be held in the first case 31, without being dependent on the second case 51. For example, even if the second case 51 drops off from the first case 31, the inner cup 34 is held in the first case 31. As a result, the function of the main float valve 21 and the fuel retainer 22 is maintained.

The connection mechanism 26 and the connection mechanism 27 are arranged to be spaced from each other in the axial direction, on the first case 31. The connection mechanism 26 is formed in the small diameter part 31a. The connection mechanism 27 is formed in the large diameter part 31b. These arrangements are effective for restricting a bad influence between the connection mechanism 26 and the connection mechanism 27. For example, the engagement in the connection mechanism 26 is restricted from becoming loose, which is caused by a deformation of the first case 31 in the connection mechanism 27. For example, if the large diameter part 31b is deformed such that the second case 51 drops off from the first case 31, the deformation of the small diameter part 31a can be restricted by the stepped part 31c. Therefore, the engagement in the connection mechanism 26 can be restricted from becoming loose.

(Baffle Component of Sub Float Valve)

In FIG. 2, FIG. 3, and FIG. 6, the sub float valve 23 has the baffle component 81. The baffle component 81 is a plate-shaped component, and is disposed on the outer side of the movable valve object 54 in the radial direction. The baffle component 81 is a cylindrical component. The baffle component 81 extends in the move direction of the movable valve object 54, that is, along the fuel supply control valve 3 in the axial direction. The baffle component 81 extends in the axial direction along the outer circumference of the movable valve object 54. A narrow annular inner passage 82 is defined between the baffle component 81 and the movable valve object 54. The baffle component 81 is formed in the third case 53.

The baffle component 81 is disposed between the inner circumference surface of the second case 51 and the outer circumference surface of the movable valve object 54. An opening 55 and an outer passage 56 are defined between the baffle component 81 and the second case 51. The distance in the radial direction between the baffle component 81 and the movable valve object 54 is smaller than the distance in the radial direction between the baffle component 81 and the second case 51.

The baffle component 81 extends in the circumferential direction of the movable valve object 54 within a predetermined range. The predetermined range of the baffle component 81 in the circumferential direction is set up so that the movable valve object 54 is not lifted by the fluid which flows through the outer passage 56. It is desirable to set the predetermined range of the baffle component 81 in the circumferential direction by corresponding to the range of the opening 55. In the illustrated example, the baffle component 81 is a cylindrical component surrounding over all the outer circumferences of the movable valve object 54.

The baffle component 81 has a predetermined height in the axial direction of the fuel supply control valve 3. The height of the baffle component 81 is set up so that the movable valve object 54 is not lifted by the fluid which flows through the outer passage 56. That is, the baffle component 81 has the height extending from outside of the opening 55, passing through the opening 55, and is extended into the opening 55. The height of the baffle component 81 is set to cover the cylindrical surface of the movable valve object 54 on the outer side in the radial direction when the movable valve object 54 is at the illustrated valve open position. In other words, the baffle component 81 can cover the outer circumference surface of the movable valve object 54 along the axial direction. It is desirable that the baffle component 81 covers more than or equal to half of the outer circumference surface of the movable valve object 54, when the movable valve object 54 is at the lowest base position. In the illustrated example, the baffle component 81 covers the whole outer circumference surface of the movable valve object 54, when the movable valve object 54 is at the base position.

The opening 55 and the outer passage 56 provide a cross-section area which is clearly larger than the inner passage 82. Gas and liquid fuel are introduced from the opening 55 and flow through the outer passage 56. Gas and liquid fuel flow also through the inner passage 82. However, the flow rate in the inner passage 82 is restricted by the cross-section area of the inner passage 82 and openings 57 and 58. The openings 57 and 58 are always open to introduce and discharge the fuel relative to a space inside of the baffle component 81 in the radial direction. The flow rate in the inner passage 82 is less than the flow rate in the outer passage 56. Therefore, the flow rate of fluid (gas and/or liquid) in the inner passage 82 is too small to move the movable valve object 54 upward.

In the outer passage 56, a flow arises which goes upwards from the bottom. The flow of fluid in the outer passage 56 acts on the movable valve object 54 so that the movable valve object 54 is moved upward. In case where there is no baffle component 81, if much fluid flows through the fuel supply control valve 3, the movable valve object 54 may reach a valve closed state. For example, when a negative pressure of the internal-combustion engine is supplied to the fuel supply control valve 3 through the fuel evaporation processing unit 4, air and liquid fuel may flow into the outer passage 56 from the fuel tank 2. In this case, the baffle component 81 restricts the direct contact between the fluid which flows through the outer passage 56, and the movable valve object 54. Thereby, the movable valve object 54 can be restricted from being lifted upward by the fluid flowing upward through the outer passage 56, and the sub float valve 23 is prevented from reaching the valve closed state.

In the illustrated embodiment, the movement of the movable valve object 54 caused by the flow of fluid in the outer passage 56 can be certainly restricted. The movable valve object 54 has a buoyant force reduction mechanism which gradually decreases the buoyant force in fuel. Therefore, when the surface of fuel exceeds the baffle component 81, the movable valve object 54 once floats in fuel, in the baffle component 81, and sinks in fuel. Therefore, the movable valve object 54 can respond to the height of liquid surface faithfully, without being affected by the flow of fluid in the outer passage 56.

(Operation)

Returning to FIG. 1, the operation of the fuel supply control valve 3 is explained. In case where the liquid surface FL of fuel in the fuel tank 2 is low enough, when fuel is refueled in the fuel tank 2 from the fueling device 5, gas will be discharged from the fuel tank 2 to the fuel evaporation processing unit 4 via the fuel supply control valve 3. At this time, the main float valve 21 and the sub float valve 23 of the fuel supply control valve 3 are opened.

As illustrated in FIG. 2, fluid (gas or liquid) flows in the arrow direction UW. When the liquid surface FL of fuel is low, gas is discharged via the fuel supply control valve 3, such that adverse current of the fuel for the fueling device 5 is not produced. Therefore, the fuel supply from the fueling device 5 to the fuel tank 2 advances, and the liquid surface goes upward gradually.

As shown in FIG. 1, when the liquid surface of fuel arrives at the lower end of the fuel supply control valve 3, and when the fuel covers the lower end opening, the fuel goes upward quickly inside of the fuel supply control valve 3. While the inside and the outside of the fuel supply control valve 3 are communicated with each other by the through hole 33, since the amount of air which passes the hole is restricted by the through hole 33, the fuel goes upward quickly inside of the fuel supply control valve 3.

Soon, the movable valve object 54 floats in the fuel which goes upward inside of the fuel supply control valve 3. The movable valve object 54 forces the seal component 66 onto the second valve seat 52. Therefore, the sub float valve 23 shifts from the open state to the closed state. Thereby, discharge of gas via the fuel supply control valve 3 is intercepted. As a result, the fuel refueled from the fueling device 5 flows backwards to a filler pipe. The fueling device 5 detects the fuel which flowed backwards to the filler pipe, and stops the fuel supply automatically. This automatic stop is a first-time automatic stop. Such an automatic stop function is generally equipped by the fueling device 5 as an auto-stop mechanism.

In parallel to the automatic stop of fuel supply, gas accumulated in the first air reservoir 61 is gradually discharged from the through hole 63. The through hole 63 discharges gas to the inside of the fuel supply control valve 3. When gas is discharged from the first air reservoir 61, fuel is introduced into the first air reservoir 61. As a result, the first air reservoir 61 gradually loses the buoyant force. The buoyant force which pushes the movable valve object 54 against the second valve seat 52 cannot be provided only by the second air reservoir 62. Therefore, the movable valve object 54 sinks soon, and the sub float valve 23 returns to the open state from the closed state. In addition, the liquid surface of fuel in the fuel supply control valve 3 also falls by the ventilation of the through hole 33. Therefore, the movable valve object 54 goes downward also due to the fall of in the liquid surface, and the sub float valve 23 returns to the open state from the closed state. When the sub float valve 23 opens, the additional fuel supply from the fueling device 5 becomes possible.

After the first-time automatic stop, a worker who operates the fueling device 5 tries to fuel by a small quantity slowly as a small quantity fueling. While the movable valve object 54 sinks in fuel, the liquid surface of fuel goes upward inside of the fuel supply control valve 3 by the small quantity fueling. Soon, fuel reaches the upper end opening 35 of the inner cup 34, and flows into the fuel reservoir in the inner cup 34. The fuel entering the fuel reservoir gives buoyant force to the float 41, and the movable valve object 39 floats in fuel and moves upward. In case where the worker continues rapid fuel supply, the movable valve object 39 floats similarly, and moves upward.

When the movable valve object 39 floats in fuel and goes up, the seal component 44 is forced onto the first valve seat 32. Thereby, the main float valve 21 shifts from the open state to a closed state. Thereby, the ventilation passage via the fuel supply control valve 3 is intercepted. As a result, the fuel refueled from the fueling device 5 flows backwards to the filler pipe. The fueling device 5 detects the fuel which flowed backwards to the filler pipe, and stops the fuel supply automatically. This automatic stop is a second-time automatic stop.

The movable valve object 39 maintains the valve closed state over a predetermined period of time assumed that the worker will give up further fueling. Therefore, the worker ends the fuel supply work. This is because fuel can be stored in the inner cup 34 while the liquid surface of fuel falls in the first case 31.

The through hole 33 discharges the fuel introduced excessively in the fuel supply control valve 3, and introduces air to lower the liquid surface in the fuel supply control valve 3. Thereby, the liquid surface of fuel falls outside of the fuel reservoir of the inner cup 34. The through hole 36 gradually discharges fuel from the fuel reservoir. Furthermore, when the vehicle moves, the ball 38 moves. Thereby, the ball 38 opens the through hole 37. The fuel in the fuel reservoir is discharged also from the through hole 37. As a result, the movable valve object 39 moves downward. When the movable valve object 39 moves downward, the pilot valve 45 will open first, and then the seal component 44 will separate from the first valve seat 32. Thereby, the main float valve 21 returns to the open state from the closed state. As a result, the refueling to the fuel tank 2 becomes possible.

Other Embodiment

The disclosure in this description is not restricted to the illustrated embodiment. The disclosure includes the illustrated embodiments and modifications by a person skilled in the art based on the illustrated embodiments. For example, disclosure is not limited to the component and/or the combination of the components shown in the embodiments. The disclosure can be carried out with various combinations. The disclosure may use additional parts which can be added to the embodiments. The disclosure may contain modifications in which component and/or element of the embodiments are removed. The disclosure may contain modifications in which component and/or element of the embodiments are exchanged or combined. Technical scope of disclosure is not limited to the embodiments. It should be understood that some disclosed technical scope may be shown by description in the scope of claim, and contain all modifications which are equivalent to and within description of the scope of claim.

The present disclosure is applied to the fuel supply control valve 3 in the embodiment. The present disclosure can be applied to various vent control valves for fuel tank, without being restricted to the fuel supply control valve 3. For example, the present disclosure can be applied to a vent control valve equipped with only one of the main float valve 21 and the sub float valve 23, or a vent control valve using a movable valve object which does not float in fuel. The present disclosure may be applied to a vent control valve called a rollover valve or a cut valve. The present disclosure may be applied to a vent control valve installed between the fuel tank 2 and the fuel evaporation processing unit 4, separated from the fuel tank 2.

The present disclosure is applied to the fuel supply control valve 3 in the embodiment. The present disclosure can be applied to various vent control valves for fuel tank, without being restricted to the fuel supply control valve 3. For example, the present disclosure can be applied to a vent control valve equipped with only one of the main float valve 21 and the sub float valve 23, or a vent control valve using a movable valve object which does not float in fuel. The present disclosure may be applied to a vent control valve called a rollover valve or a cut valve. The present disclosure may be applied to a vent control valve installed between the fuel tank 2 and the fuel evaporation processing unit 4, separated from the fuel tank 2.

In the embodiment, a seal line is formed of one ridge part 68, 268, 368. Alternatively, the vent control valve may have plural ridge parts. For example, the movable valve object 54 may have both the ridge part 68 and the ridge part 268. Moreover, instead of the illustrated one ridge part 68, multiplex ridge part may be provided. Furthermore, the ridge part 68, 268, 368 may be shaped in various form other than the approximately triangular protruding part projected from the plane. For example, the ridge part may be a protruding part having a semi-circle shape. Moreover, the ridge part may be provided by a corner of the annular stepped part.

In the embodiment, the inner periphery part 66a of the seal component 66 is held by the movable valve object 54. Alternatively, an outer edge of the seal component 66 may be held by the movable valve object 54.

In the embodiment, the first connection mechanism 26 and the second connection mechanism 27 are formed inside of the first case 31. Alternatively, a part of the first connection mechanism 26 and the second connection mechanism 27 may be exposed to the outside of the first case 31. For example, a window part may be defined in the first case 31 so that the engaging part 34c can be seen from the outside. Moreover, the second connection mechanism 27 may be provided by a hook part extending from the second case 51 toward the outer circumference surface of the first case 31, and an engaging part defined in the outer circumference surface of the first case 31. The third case 53 is connected to the second case 51 in the embodiment. Alternatively, the third case 53 may be connected to the first case 31.

In the embodiment, the first connection mechanism 26 and the second connection mechanism 27 are provided by the snap fit using the elasticity of resin. Alternatively, the connection mechanism can be provided by various mechanical connection mechanisms. For example, a connection mechanism may be provided by a mechanism tightening two components to be connected by relatively rotating mutually. Moreover, a connection mechanism may be provided by an additional component such as clip, screw, or cover, which connects two components.

The cylindrical baffle component 81 is adopted in the embodiment. Alternatively, a baffle component having a partially-cylindrical-shape may be adopted. For example, a circular baffle component may be provided only in the range equivalent to the opening 55. Moreover, the movable valve object 54 is guided by the guide mechanism 67 in the embodiment. Alternatively or additionally, the movable valve object 54 may be guided by the baffle component 81.

What is claimed is:

1. A vent control valve for a fuel tank, that is adapted to control a ventilation between the fuel tank and an outside, the vent control valve comprising:
    a first case shaped in a tube that forms a passage for ventilation;
    a movable valve object arranged in the first case to open and close the passage, the movable valve object being inserted in the first case from a lower end opening of the first case;
    an inner case arranged in the first case to support the movable valve object, the inner case being inserted in the first case from the lower end opening of the first case;
    a second case disposed at a lower end of the first case;
    a first connector disposed between the first case and the inner case, the first connector connecting the first case and the inner case with each other; and
    a second connector disposed between the first case and the second case, the second connector connecting the first case and the second case with each other, wherein
    the first connector and the second connector are disposed to separate from each other in an axial direction of the first case,
    the first case has
        a large diameter part including the lower end,
        a small diameter part having a diameter smaller than that of an inner diameter of the large diameter part, the small diameter part being coaxial with the large diameter part, and
        a stepped part disposed between the large diameter part and the small diameter part, along an axial direction of the first case,
    the first connector is disposed in the small diameter part,
    the second connector is disposed in the large diameter part, and
    the first case and the inner case are separable from each other at the first connector, and the first case and the second case are separable from each other at the second connector.

2. The vent control valve according to claim 1, wherein the first connector has
    an arm part defined in the inner case and extending in an axial direction to separate from the second connector,
    a first engaging part disposed at a tip end of the arm part to be movable by an elastic deformation of the arm part, and
    a second engaging part defined in the first case to engage with the first engaging part.

3. The vent control valve according to claim 2, wherein the inner case further has a flange part interposed between the first case and the second case.

4. The vent control valve according to claim 1, wherein the movable valve object provides a main float valve, the vent control valve further comprising:
    a sub float valve arranged in the second case, wherein the sub float valve includes a movable valve object which opens and closes a passage extending from the lower end of the first case to the main float valve.

5. The vent control valve according to claim 1, wherein the first case is a cylindrical component disposed as perpendicular in the fuel tank.

6. The vent control valve according to claim 1, further comprising:
    an engaging part having a flange part abutting an inner surface of the stepped part and a top surface of the second case.

* * * * *